United States Patent [19]

Georg et al.

[11] 4,037,876
[45] July 26, 1977

[54] TIGHTENING ARRANGEMENT FOR LONGWALL MINING MACHINE CABLE AND CONVEYOR

[75] Inventors: Werner Georg; Walter Heberling, both of Lunen; Werner Langenberg, Werne, all of Germany

[73] Assignee: Gewerkschaft Eisenhutte Westfalia, Wethmar near Lunen, Germany

[21] Appl. No.: 636,419

[22] Filed: Dec. 1, 1975

[30] Foreign Application Priority Data

Dec. 6, 1974 Germany .............................. 2457790

[51] Int. Cl.$^2$ ...................... E21C 29/16; E21C 35/20
[52] U.S. Cl. ...................................... 299/43; 198/813
[58] Field of Search .................. 299/18, 32, 34, 43–50; 198/208, 204

[56] References Cited

U.S. PATENT DOCUMENTS

| 1,571,009 | 1/1926 | Holzer | 198/204 X |
| 2,689,717 | 9/1954 | Bainbridge | 299/34 |
| 3,504,944 | 4/1970 | Holz et al. | 299/43 X |
| 3,809,431 | 5/1974 | Nakajima | 299/34 |

FOREIGN PATENT DOCUMENTS 932,455   7/1963   United Kingdom .................. 299/34

*Primary Examiner*—Ernest R. Purser
*Attorney, Agent, or Firm*—Lowe, King, Price & Markva

[57] ABSTRACT

A longwall conveyor composed of channel sections arranged end-to-end and a scraper-chain assembly moved to transfer material along the channel sections has a main drive station at one end and an auxiliary drive station at the other end. Each drive station has a frame rotatably supporting a drum around which is entrained the scraper-chain assembly. Drive motor and gearing units are carried by the frames and drive the drums. At each drive station there is a housing in which a sprocket wheel drivably engages with a chain used to haul a plough or a similar machine along the conveyor. Drive motor and gearing units are supported by the housings and drive the sprocket wheels. The housing and sprocket wheel at the main drive station is slidably mounted on the frame and a piston and cylinder unit effects slidable displacement of the housing to vary the tension in the drive chain. The frame at the auxiliary drive station is also slidably mounted to a structure rigidly connected to the conveyor channel sections and supporting or forming the housing thereat. Piston and cylinder units effect slidable displacement of the frame to independently vary the tension in the scraper-chain assembly.

22 Claims, 7 Drawing Figures

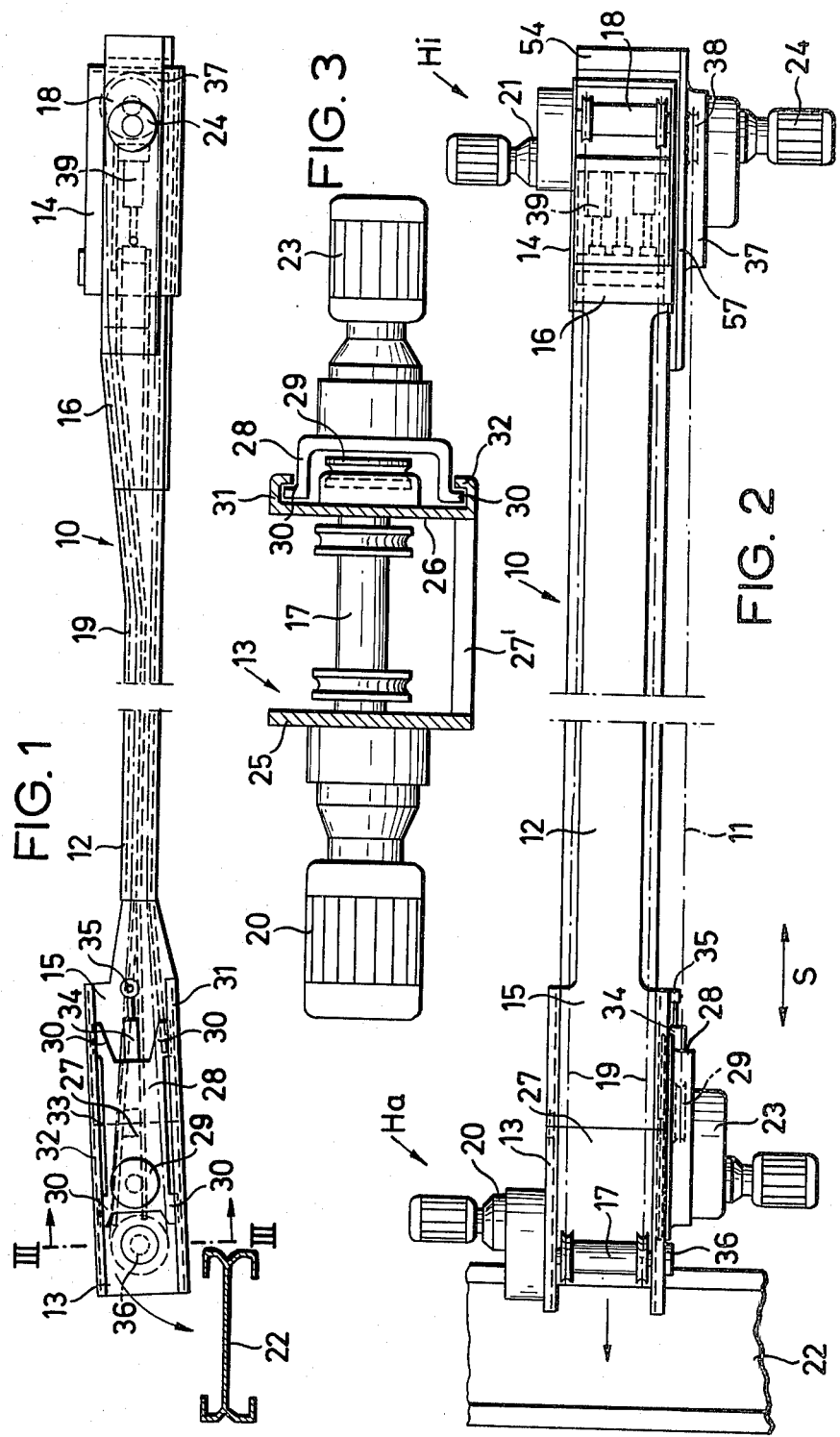

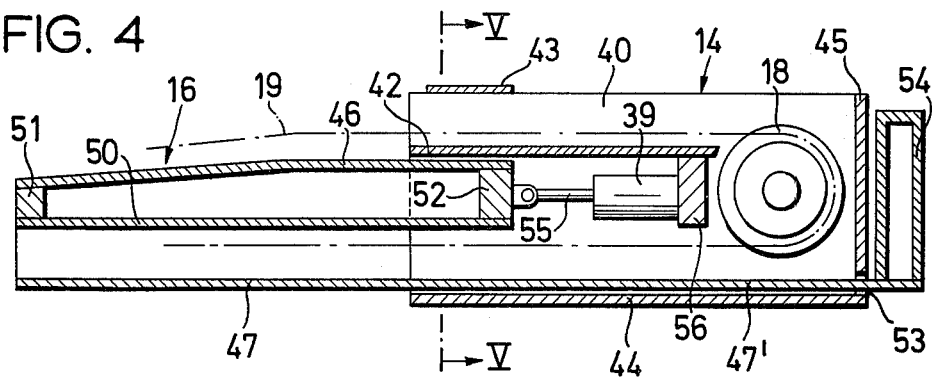
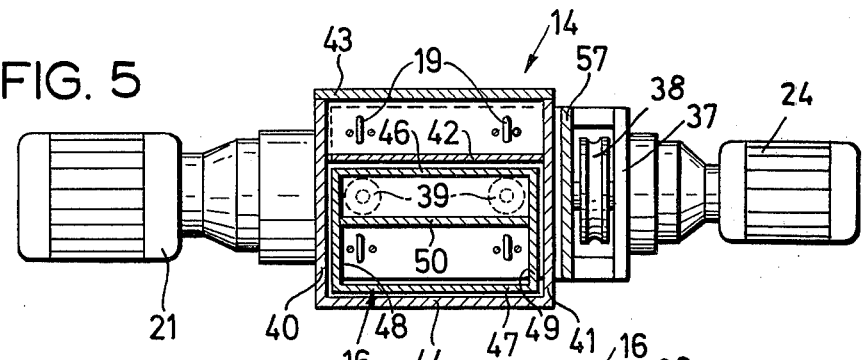
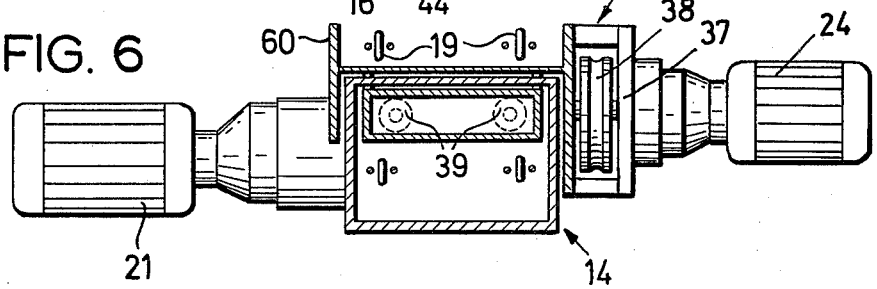
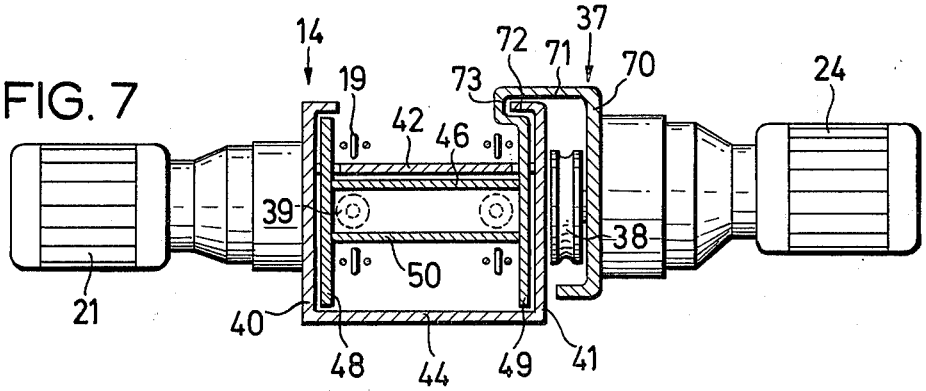

TIGHTENING ARRANGEMENT FOR LONGWALL MINING MACHINE CABLE AND CONVEYOR

BACKGROUND TO THE INVENTION

The present invention relates to mineral mining installations employing scraper-chain conveyors.

It is well known to use longwall scraper-chain conveyors to transport mineral, e.g. coal in a mine working and to guide a mining machine, e.g. a plough, on the conveyor.

The machine is then driven with the aid of a chain circulated along the conveyor.

The conveyor usually has frames at its ends which rotatably support drums around which the scraper-chain assembly is entrained. Drive means serves to rotate one or both of these drums and further drive means, conveniently connected to the mineral face side of one or both frames, serves to drive the chain and hence the machine. Normally the frame and drive means at the discharge end of the conveyor is termed the main drive station and the frame and drive means at the opposite end is termed the auxiliary drive station.

In such installations it is generally desirable to control the tension in the drive chain and preferably in both the drive chain and the scraper-chain assembly. In order to control the tension in the drive chain it is known, for example from German Patent Specification 2135163, to have a sprocket driving the chain mounted on a unit, such as a housing termed a sprocket-box, which is displaceable in relation to the frame at one end of the conveyor.

A general object of the present invention is to provide an improved installation of the aforementioned kind.

SUMMARY OF THE INVENTION

In its broadest aspect the invention provides separate and independent tensioning control for the drive chain and for the scaper-chain assembly of the conveyor. To achieve the latter-mentioned control the invention proposes that a machine frame rotatably supporting a drum around which the scraper-chain assembly extends and disposed at one end of the conveyor should be bodily displaceable in relation to the remainder of the conveyor.

In one preferred form the invention provides a mineral mining installation comprising a scraper-chain conveyor with drive stations at its ends with frames and drive motor and gearing units, the drive units serving to drive a scraper-chain assembly to effect transference of material along the conveyor and to drive a sprocket engaging a chain used to move a mining machine along the conveyor, means for displacing one of said frames to thereby adjust the tension in the scraper-chain assembly and means for displacing a mounting for said sprocket wheel to independently adjust the tension in the drive chain.

The invention also provides a mineral mining installation which comprises a scraper-chain conveyor with drive stations at its ends for driving a scraper-chain assembly to effect transference of material along the conveyor and for driving a chain used to move a mining machine along the conveyor, means at one drive station for adjusting the tension in the drive chain and means at the other drive station for independently adjusting the tension in the scraper-chain assembly.

Preferably each drive station has a frame disposed adjacent the endmost of a series of conveyor channel sections arranged end-to-end along which the scraper-chain is circulated and wherein the means for adjusting the tension in the drive chain serves to displace a sprocket wheel engaged with the chain in relation to the frame of said one drive station and the means for adjusting the tension in the scraper-chain assembly serves to displace the frame of said other drive station. The drive means for the chain may each comprise a drive motor and gearing unit supported by a housing in which is disposed a sprocket wheel drivably engaging with the chain and driven by said unit. By making the housing at the one drive station slidable in relation to the frame the requisite variation in chain tension can be achieved.

Preferably the one drive station is the main drive station and the other drive station is an auxiliary drive station so that the tension control for the drive chain is effected at the main drive station whereas the tension control for the scraper-chain assembly is effected at the auxiliary drive station. Since the mineral or material transported by the conveyor is discharged at the main drive station any movement of the frame at the auxiliary drive station necessary to alter the tension in the scraper-chain assembly can be achieved without affecting the discharge of material. It is also easier from the constructional point of view to modify the frame of the auxiliary drive station for movement since the discharging function at the main drive station imposes certain limitations on such modifications.

Since any movement of the frame to produce a variation in the tension in the scraper-chain assembly should not affect the tension in the drive chain it follows that the chain engaging sprocket at the auxiliary drive station should not be mounted to the frame. Preference is given to an installation wherein an intermediate connecting structure is disposed between each frame and the adjacent endmost channel section and is connected to the latter and wherein the housing at the auxiliary drive station is secured to the associated connecting structure or formed integrally therewith.

The means for adjusting the tension in the scraper-chain assembly and in the drive chain may each comprise at least one hydraulic piston and cylinder unit. These units would be operable to move the frame at the auxiliary drive station and to move the housing and sprocket wheel at the main drive station.

It is preferable to provide guide means between the housing at the main drive station and the frame and more preferably between the housing on the one hand and the frame and adjoining connecting structure on the other hand. This then permits the housing to be slidably moved along the frame and along the connecting structure at will. It follows that the frame and connecting structure should be secured together, preferably by bolts and location means such as dowels or pins received in sleeves or the like can ensure correct alignment between these components. The guide means for the housing may take the form of guide elements such as flanges or similar projections engaging in grooves or guideways formed on the external sides of the frame and connecting structure.

The frame at the auxiliary drive station can be conveniently displaceably mounted to the connecting structure or a part thereof with the latter itself being secured to the endmost conveyor channel section. Guide means can be provided to slidably guide the frame with respect to the connecting structure. This guide means can conveniently be in the form of plates or walls arranged as a drawer-like guide system. For example, the frame and the connecting structure at the auxiliary drive station may each be of box-like construction with at least part of the connecting structure extending within the frame. Alternatively, the frame and the connecting structure may each have side walls interconnected by one or more transverse walls so that at least part of the connecting structure partly surrounds the frame. The invention thus provides in this aspect a special drive station for a conveyor which is composed of a frame rotatably supporting a drum around which the scraper-chain assembly of the conveyor extends, drive means for driving the drum also supported by the frame, a connecting structure connected or connectible to an end channel section of the conveyor, guide means permitting the frame to be slidably displaced in relation to the structure to thereby vary the tension in the scraper-chain assembly, at least one piston and cylinder unit connected to effect the displacement of the frame and further drive means for driving a chain engaging sprocket wheel supported by the connecting structure. Various detailed constructional forms of the frame and connecting structure will be described hereinafter.

In accordance with the invention there may also be provided a mineral mining installation comprising a longwall scraper-chain conveyor composed of channel sections arranged end-to-end and a scraper-chain assembly movable along the channel sections, main and auxiliary drive stations for driving the scraper-chain assembly and a separate chain used to move a mining machine along the conveyor, each drive station having a frame and drive motor and gearing units and means for independently adjusting the tension in the drive chain and in the scraper-chain assembly, wherein the means for adjusting the tension in the drive chain effects relative movement between a chain engaging sprocket wheel and the frame of one of the drive stations and the means for adjusting the tension in the scraper-chain assembly effects relative movement between the frame of the other of the drive stations and adjacent channel sections of the conveyor.

The invention may be understood more readily, and various other features of the invention may become apparent, from consideration of the following description.

BRIEF DESCRIPTION OF DRAWINGS

Embodiments of the invention will now be described by way of examples only, with reference to the accompanying drawings, wherein:

FIG. 1 is a schematic side view of a mineral mining installation, and more particularly of a longwall conveyor, made in accordance with the invention;

FIG. 2 is a plan view of the installation represented in FIG. 1;

FIG. 3 is a sectional end view of the installation represented in FIGS. 1 and 2, the view being taken along the line III—III of FIG. 1;

FIG. 4 is a sectional side view of the auxiliary drive station of the installation represented in FIGS. 1-3;

FIG. 5 is a sectional end view of the drive station shown in FIG. 4, the view being taken along the line V—V of FIG. 4; and FIGS. 6 and 7 are sectional views corresponding to FIG. 5 but illustrating alternative constructional forms thereof.

DESCRIPTION OF PREFERRED EMBODIMENTS

Referring initially to FIGS. 1 and 2, a mineral mining installation employs a scraper-chain conveyor denoted 10, constructed in known manner from a plurality of channel sections joined end-to-end and arranged alongside a mineral face and more usually a coal face or seam. The individual channel sections are not shown as such in the drawings but are represented by numeral 12. These channel sections would normally be interconnected so as to permit a certain amount of relative movement between the sections 12. A mining machine, such as a plough, (not shown) is mounted in known manner on the mineral face side of the conveyor 10 and is guided for movement back and forth along the conveyor 10 to detach mineral from the face; the detached mineral being collected by the channel sections 12 of the conveyor 10. An endless chain represented by the chain-dotted line 11 in FIG. 2 serves to drive the mining machine along the conveyor 10.

At the ends of the conveyor 10 there are provided drive stations, H$a$, H$i$ which include frames 13, 14 connected to the adjacent endmost channel sections 12 by intermediate connecting structures 14, 15. The station H$a$ constitutes the main drive station and the station H$i$ constitutes an auxiliary drive station. Each frame 13, 14 rotatably supports a drum 17, 18 around which the scraper-chain assembly, denoted 19, of the conveyor 10 is entrained. Each frame 13, 14 also supports, on its side remote from the mineral face, drive means for the drums 17, 18 in the form of a drive motor and gearing unit 20, 21. The operation of the drive means 20, 21 serve to rotate the drums 17, 18 to circulate the scraper-chain assembly 19 along the conveyor 10 to thereby transport the mineral, e.g. coal, detached by the mining machine, e.g. the plough. The transport material is moved along the channel sections 12 towards the main drive station H$a$ whereat the material is discharged into a further conveyor 22 as depicted by the arrows in FIGS. 1 and 2. This further conveyor 22 is arranged to extend more or less perpendicularly to the conveyor 10 and lies in the drift or roadway at the end of the longwall face.

At the mineral face side of each frame 13, 14 there is disposed drive means for the chain 11 in the form of a drive motor and gearing unit 23, 24.

As shown in FIG. 3, the frame 13 of the main drive station H$a$ comprises two upstanding parallel side wall members 25, 26 between which a floor member 27 (FIGS. 1 and 2) is welded. This floor member 27 forms a continuation, through a corresponding floor member of the intermediate structure 15, of the floor of the conveyor channel sections 12. A tie plate or strut 27' also extends between the members 25, 16 at their lower edges. Bearings (not shown) are located on the members 25, 26 to rotatably support the drum 17 and the drive unit 20 is drivably coupled to the drum 17. The frame 13 is connected by bolts or the like to the structure 15. At the mineral face side a generally U-shaped housing 28 forms a sprocket box and supports the drive unit 23 for the chain 11. This housing 28 is slidably mounted to the side member 26 of the frame 13 by guide means.

More particularly, in this construction the side member 26 has overturned lips at its upper and lower ends which provide grooves or guideways 31, 32 and the housing 28 has outwardly projecting flanges 30 which form guide elements slidably received in these guideways 31, 32. Alternatively instead of continuous flanges 30 the housing 28 may have equivalent upper and lower projections 30 at each of its outer ends, as represented in FIG. 1, engaging in the guideways 31, 32. It is desirable to construct the structure 15 in a similar way to the frame 13 so that it has guideways forming continuations of the guideways 31, 32 permitting the housing 28 to be moved along the frame 13 and the structure 15. The main wall of the housing 28 locates a bearing for a sprocket wheel 29 located between the main wall of the housing 28 and the member 26 and this sprocket wheel 29 which is driven by the drive unit 23 meshes or drivably engages with the chain 11. By the provision of the slidable displacement mounting for the components 28, 29, 23 in the directions represented by arrow S in FIG. 2 the tension in the chain 11 can be altered. In its normal position, represented in FIG. 1, the housing 28 covers the juncture 33 between the connecting structure 15 and the frame 13. In order to adjust the position of the housing 28 and hence also the drive unit 23 and the sprocket wheel 29, in either of the directions to thereby increase or reduce the tension in the chain 11 an hydraulic double-acting piston and cylinder unit 34 is provided. This unit 34 which is at least partly in the space defined by the housing 28, has its piston rod articulated by a detachable joint to the structure 15 and its cylinder connected to the housing 28.

Preferably the stroke of the unit 34 permits the housing 28 to be displaced by a relatively great distance along the structure 15 and the frame 13. This allows the housing 28, for example, to extend over the bearings in the side members 26, 25 for the drum 17 and in this position the connection bolts or the like securing the structure 15 to the frame 13 can be made accessible, permitting disassembly if desired. Conversely the housing 28 can be moved in the other direction to make the bearings and the drum 17 accessible and to permit disassembly and replacement.

At the auxiliary drive station Hi a housing 37, structurally similar to the housing 28, is detachably secured by bolts or screws to a mineral face side of the connecting structure 16 so that in contrast to the housing 28, the housing 37 can not be displaced. This housing 37 again has a main wall to which is mounted the drive unit 24 which drives a sprocket wheel 38 disposed between the housing 37 and the side of the structure 16. The main wall of the housing 37 locates the bearing for the sprocket wheel 38.

In the case of the auxiliary drive station Hi the frame 14 is itself displaceable in relation to the structure 16 which is itself connected to the endmost conveyor channel section 12 and to the housing 37. Guide means is provided between the frame 14 and the structure 16 as will become apparent and this displaceability of the frame 14 thus permits adjustment of the tension in the chain or chains of the scraper-chain assembly entrained around the drums 17, 18. Various constructional forms permitting the displaceability of the frame 14 will now be described. Referring now to FIGS. 4 and 5, the frame 14 is composed of two parallel upstanding side wall members 40, 41 between which a floor member 42 is welded for continuity with the channel sections 12. The side wall members 40, 41 are also interconnected at their upper edges by a top plate 43, at their lower edges by a bottom plate 44 and at their rear ends by a rear plate 45 to thereby produce a rigid box-like construction. The bottom plate 44 forms a floor for the lower return run of the scraper-chain assembly 19 and the top plate 43 extends over the upper working run of the assembly 19. The connecting structure 16 is generally disposed within the space defined between the side wall members 40 and the plates 43, 44 but has an external side wall 57 to which the housing 37 is mounted. The structure 16 is also a rigid box-like construction formed from side wall members 48, 49 with a floor member 46 and a bottom plate 47 welded between the members 48, 49. The floor member 46 is here of composite form (FIG. 4) formed from an upper plate, a lower plate 50 and crosspieces 51, 52 welded therebetween. The upper plate of this floor member 46 lies just beneath or in slidable contact with the floor member 42 of the frame 14 and forms a continuation of the floor of the channel sections 12. The lower plate 50 extends over the lower return run of the scraper-chain assembly 19. As shown in FIG. 4, the plate 47 of the structure 16 has a portion 47' which extends rearwardly beyond the floor member 46 and just above or in slidable contact with the bottom plate 44 of the frame 14. The rear plate 45 has a recess 53 through which the portion 47' of the plate 47 projects. A box-like member 54 is attached to the outer projecting end part of the plate 47 to form a stop, engageable on the rear plate 45 of the frame 14. The external side wall 57 can be secured to this member 54. The arrangement as described permits the frame 14 to be displaced in relation to the structure 16 and to effect such displacement two double-acting hydraulic piston and cylinder units 39 are provided. These units 39, which are disposed beneath the floor member 42 of the frame 14, have their piston rods articulated to the end cross piece 52 of the floor member 46 of the structure 16 and their cylinders connected to a rigid support 56 depending from the floor member 42. Operation of the units 39 can thus displace the frame 14 in relation to the structure 16 and in either direction depicted by arrow S in FIG. 2.

The construction of the frame 14 and the structure 16 as described, provides a drawer-like guide means or system (42, 46, 47', 44, 48, 49, 40, 41) for guiding the frame 14. In general, the length of the plate 47 determines the maximum outward displacement of the frame 14 and the stop 54 limits this outward movement. The displacement of the frame 14 will, as mentioned, alter the tension in the scraper-chain assembly 19 but since the sprocket wheel 38 for the chain 11 is effectively positionally fixed to the structure 16 any variation of the tension in the assembly 19 will not affect the tension in the chain 11.

FIG. 6 depicts an alternative construction for the frame 14 and the structure 16. Here the side wall members of the frame 14 terminate at the floor member thereof and the plate 43 is omitted. The floor member 46 of the structure 16 may take the same form as in FIGS. 4 and 5 with the units 39 arranged as before. The structure 16 is however modified to have an extension 60 functionally analogous to the plate portion 47', which has a generally H-shaped profile in cross-section. This extension has sides which lie outside the side member of the frame 14 and a transverse wall which overlies the floor member 42 of the frame 14. This arrangement again provides a drawer-like guide means or system between the extension 60 and the side and floor members of the frame 14. A stop (not shown) can again be provided. As shown, the housing 37, the drive unit 24, and the sprocket wheel 38 are all mounted to the external mineral face side of the extension 60.

FIG. 7 depicts a further modified form for the frame 14 and the structure 16. Here again the top plate 43 of FIGS. 4 and 5 is omitted. The side members 40, 41 of the frame 14 have inwardly-turned flanges 72 at their upper edges and the sides 48, 49 of the structure 16 are prolonged upwardly in relation to FIGS. 4 and 5 to extend into recesses in the floor member 42. The mineral face side 49 is formed to extend around the upper flange 72 of the side wall member 41. More particularly, the side 49 has a portion 73 enclosing the flange 72 and adjoining a top wall portion 71. A U-shaped portion 70 having its main section parallel to the wall member 41 adjoins this top wall portion 71. The portions 70, 71 thus form the housing 37 which was a separate component in the other constructions.

The drive unit 24 is mounted to the portion 70 and the sprocket wheel 38 is rotatably supported by a single sided bearing located by the portion 70.

As can be appreciated once again there is a drawer-like guide means or system acting between the frame 14 and the connecting structure 16.

We claim:

1. A mineral mining installation which comprises:
   a scraper-chain conveyor with channel sections arranged end-to-end and a scraper-chain assembly movable along said channel sections;
   drive stations at the ends of the conveyor for driving the scraper-chain assembly to effect transference of material along the channel sections of the conveyor and for driving a chain used to move a mining machine along the conveyor;
   each drive station having a frame, drive means for driving the scraper-chain assembly and drive means for driving the chain;
   each drive means for the chain comprising a drive motor and gearing unit supported by a housing in which is disposed a sprocket wheel drivably engaging with the chain and driven by said unit;
   an intermediate connecting structure disposed between each frame and the adjacent endmost channel section of the conveyor and connected to the latter;
   guide means to permit the housing at one of the drive stations to be slidably displaced in relation to the frame thereof and in relation to the associated connecting structure;
   means for adjusting the tension in the drive chain;
   said adjusting means comprising at least one hydraulic piston and cylinder unit operable to slide the housing at said one drive station along the frame and the connecting structure to thereby move the sprocket wheel engaging the chain and means at the other drive station for independently adjusting the tension in the scraper-chain assembly by displacing the frame and the scraper-chain assembly drive means of said other drive station.

2. An installation according to claim 1, wherein the frame and the connecting structure at said other drive station are each of box-like construction with at least part of the connecting structure extending within the frame.

3. An installation according to claim 1, wherein the frame and connecting structure at said one drive station each includes side wall members formed with external grooves forming a guideway and the housing thereat has guide elements engaging in the guideway with the guideway and guide elements constituting said guide means.

4. An installation according to claim 1, wherein each drive station has a drum rotatably supported by the frame and around which the scraper-chain assembly is entrained, guide means is provided between the frame and the connecting structure at the said other drive station to permit the frame to slide on the connecting structure and the means for adjusting the tension in the scraper-chain assembly comprises at least one hydraulic piston and cylinder unit operable to displace the frame in relation to the connecting structure at said other drive station.

5. An installation according to claim 1, wherein the frame and the connecting structure at said other drive station are each formed with side walls interconnected by transverse walls and at least part of the connecting structure partly surrounds the frame.

6. An installation according to claim 5, wherein each drive station has drive means for driving the drum to move the scraper-chain assembly and drive means for driving the chain and wherein the means for adjusting the tension in the drive chain serves to displace at least part of the chain drive means in relation to the frame of said one drive station.

7. An installation according to claim 6, wherein the drive means for the chain each comprises a drive motor and gearing unit supported by a housing in which is disposed a sprocket wheel drivably engaging with the chain and driven by said unit and wherein the housing at said one drive station is slidably displaceable in relation to the frame thereof to vary the tension in the chain.

8. An installation according to claim 7, wherein an intermediate connecting structure arranged between each frame and the adjacent endmost channel section is connected to the latter and wherein the housing at said other drive station is secured to the associated connecting structure.

9. An installation according to claim 7, wherein an intermediate connecting structure arranged between each frame and the adjacent endmost channel section is connected to the latter and wherein the housing at said other drive station is formed integrally therewith.

10. An installation according to claim 7, wherein an intermediate connecting structure arranged between each frame and the adjacent endmost channel section is connected to the latter, guide means is provided to permit the housing at said one drive station to be slidably displaced in relation to the frame thereof and in relation to the associated connecting structure and the means for adjusting the tension in the drive chain comprises at least one hydraulic piston and cylinder unit operable to slide the housing at said one drive station along the frame and the connecting structure to thereby move the sprocket wheel engaging the chain.

11. An installation according to claim 10, wherein the frame and connecting structure at said one drive station each includes side wall members formed with external grooves forming a guideway and the housing thereat has guide elements engaging in said guideway with the guideway and guide elements constituting said guide means.

12. An installation according to claim 5, wherein the frame and the connecting structure at said other drive station are each of box-like construction with at least part of the connecting structure extending within the frame.

13. An installation according to claim 5, wherein the frame and the connecting structure as said other drive station are each formed with side walls interconnected by transverse walls and at least part of the connecting structure partly surrounds the frame.

14. An installation according to claim 1, wherein each frame rotatably supports a drum and the scraper-chain assembly is entrained around the drums and the drive means for the scraper-chain assembly each comprises a drive motor and gearing unit drivably coupled to the associated drum.

15. An installation according to claim 14, wherein the means for adjusting the tension in the scraper-chain assembly comprises at least one hydraulic piston and cylinder unit operable to displace the frame of said other drive station.

16. An installation according to claim 1, wherein each frame rotatably supports a drum and the scraper-chain assembly is entrained around the drums and the drive means for the scraper-chain assembly each comprises a drive motor and gearing unit drivably coupled to the associated drum wherein the frame of the other drive station is slidably displaceable in relation to the associated connecting structure and there is provided guide means for slidably guiding the frame of said other drive station in relation to the connecting structure and wherein the means for adjusting the tension in the scraper-chain assembly comprises at least one hydraulic piston and cylinder unit operable to displace the frame of said other drive station.

17. A mineral mining installation which comprises:
a scraper-chain conveyor with channel sections arranged end-to-end and a scraper-chain assembly movable along said channel sections;
drive stations at the ends of the conveyor for driving the scraper-chain assembly to effect transference of material along the channel sections of the conveyor and for driving a chain used to move a mining machine along the conveyor;
each drive station having a frame, drive means for driving the scraper-chain assembly and drive means for driving the chain;
each frame rotatably supporting a drum with the scraper-chain assembly being entrained around the drums with each drive means for the scraper-chain assembly comprising a drive motor and gearing unit drivably connected to the associated drum;
each drive means for the chain comprising a drive motor and gearing unit supported by a housing in which is disposed a sprocket wheel drivably engaging with the chain and driven by said unit;
an intermediate connecting structure disposed between each frame and the adjacent endmost channel section of the conveyor and connected to the latter;
means at one of the drive stations for adjusting the tension in the drive chain by displacing at least part of the chain drive means in relation to the frame of said one drive station;
guide means for slidably guiding the frame of the other drive station for slidable displacement in relation to the associated connecting structure and means for independently adjusting the tension in the scraper-chain assembly;
said adjusting means comprising at least one piston and cylinder unit operable to displace the frame of the other drive station.

18. An installation according to claim 17 wherein the frame and the connecting structure at said other drive station are each of box-like construction with at least part of the connecting structure extending within the frame.

19. An installation according to claim 17 wherein the frame and the connecting structure at said other drive station are each formed with side walls interconnected by transverse walls and at least part of the connecting structure partly surrounds the frame.

20. An installation according to claim 17 wherein the means for adjusting the tension in the drive chain serves to displace the sprocket wheel at said one drive station.

21. A mineral mining installation comprising:
a scraper-chain conveyor with channel sections arranged end-to-end and a scraper-chain assembly movable along said channel sections;
drive stations at the ends of the conveyor for driving the scraper-chain assembly to effect transference of material along the channel sections of the conveyor and for driving a chain used to move a mining machine along the conveyor;
means at one drive station for adjusting the tension in the drive chain and means at the other drive station for independently adjusting the tension in the scraper-chain assembly wherein:
each drive station has a frame rotatably supporting a drum around which the scraper-chain assembly is entrained, an intermediate connecting structure is arranged between each frame and an endmost channel section of the conveyor;
the frame at said other drive station is slidably mounted on the connecting structure thereat;
guide means is provided between the frame and the connecting structure at said other drive station and at least one hydraulic piston and cylinder unit is provided to displace the frame to thereby vary the tension in the scraper-chain assembly.

22. An installation according to claim 21 wherein the means for adjusting the tension in the drive chain serves to displace a sprocket wheel engaged with the chain in relation to the frame of said one drive station.

* * * * *